United States Patent Office 3,019,099
Patented Jan. 30, 1962

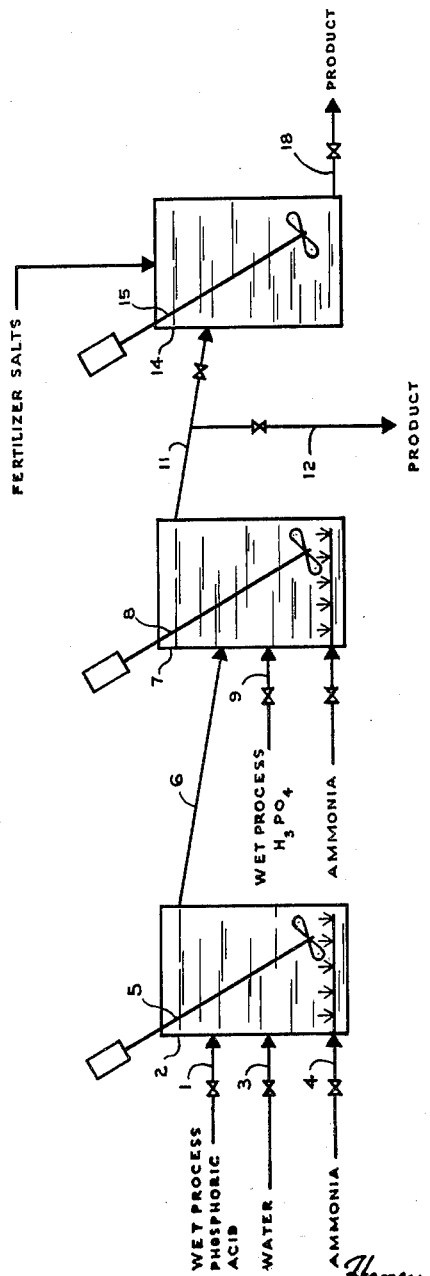

3,019,099
MANUFACTURE OF FLUID FERTILIZER FROM WET-PROCESS PHOSPHORIC ACID
Henry K. Walters, Jr., Florence, Ala., assignor to Tennessee Valley Authority, a corporation of the United States
Filed June 10, 1959, Ser. No. 819,512
3 Claims. (Cl. 71—34)
(Granted under Title 35, U.S. Code (1952), sec. 266)

The invention herein described may be manufactured and used by or for the Government for governmental purposes without payment to me of any royalty thereon.

This invention is a process for the manufacture of fluid fertilizers from wet-process phosphoric acid and ammonia.

The production and use of fertilizers in liquid or fluid form is a known way of reducing the cost of applying fertilizers to the soil. Since the fertilizer is in fluid form, it can be transferred through pipes by pumps and can be sprayed on the soil through nozzles, thereby reducing the amount of labor involved in application. Other advantages which result from the fluid form include elimination of the cost of water evaporation and of difficulties with segregation and caking, problems which are associated with solid fertilizer production.

One of the major drawbacks to fluid fertilizer production is the cost of the phosphate, which is supplied in the form of phosphoric acid.

Electric-furnace acid, the type normally used, is relatively expensive as compared to superphosphate used in making solid mixed fertilizers. Reduction in the phosphate cost could be obtained by using wet-process phosphoric acid, which is less expensive than the furnace acid in most areas. Severe technical problems are encountered, however, in using the wet-process acid. Furnace acid, made from elemental phosphorus, is relatively pure and gives a clear solution upon ammoniation. Wet-process acid, on the other hand, is made by extracting phosphate rock with sulfuric acid and contains impurities extracted from the rock along with the phosphate. Upon ammoniation, these impurities—mainly iron and aluminum—precipitate from the solution. They are difficult and expensive to separate from the solution and tend to settle and clog application equipment if left in it.

One way of avoiding these difficulties is to treat the acid (or the ammoniated product) in such way that the precipitated impurities will remain in suspension. There are several ways to do this, but it is not enough merely to produce a stable suspension. Known treatments to stabilize suspensions normally increase viscosity and, in the case of ammoniated wet-process acid, give a suspension that is so viscous as not to be usable. Moreover, the impurities in the acid impart a thixotropic tendency to the suspension, so that even if initial viscosity and stability are acceptable the suspension will, on standing, set up to a gel which is difficult to break down with the degree of agitation available in the types of application equipment normally used. Therefore, a suspension for use as a fluid fertilizer should have—even after standing for some time—(1) a high sedimentation volume (percent of total depth as settled layer), (2) a fairly low viscosity (about 500 cps. is probably the highest acceptable), (3) good pour characteristics.

It is an object of this invention to provide a process for utilizing inexpensive, wet-process phosphoric acid in the production of ammoniated fluid fertilizer.

Another object is to provide such process in which difficulties due to formation and settling of precipitates formed by reaction of ammonia and wet-process phosphoric acid are eliminated.

Still another object is to provide a process for the manufacture of stable fluid fertilizer having low viscosity, high sedimentation volume, and good pour characteristics from wet-process phosphoric acid and ammonia.

In the present invention these objects are attained by a two-stage neutralization of wet-process phosphoric acid with ammonia. In the first stage, which is preferably carried out continuously, wet-process acid and ammonia are fed into a suitable reaction vessel and are intimately mixed. The ratio of the feed rate of ammonia to the feed rate of wet-process phosphoric acid is controlled so that the pH of the solution in the reaction vessel is between 7.5 and 8.5, preferably about 8.0. The resulting mixture of ammonium phosphate and precipitate is then intimately mixed with sufficient additional wet-process phosphoric acid to bring the pH down to the range from 5.5 to 7.3, usually about 6.0 to 6.8. Thus, ammoniation to a high pH is followed by an adjustment to a lower pH under conditions of intimate mixing to give a nonsettling suspension.

In carrying out this process, sufficient water is used along with ammonia and wet-process phosphoric acid to give the final concentration of nitrogen and $P_2O_5$ desired. This final concentration usually is 8–24–0, which is the highest 1–3–0 grade that will not salt out ammonium phosphate on standing at 32° F. The process may be carried out either batchwise or continuously. When it is desired to operate batchwise, the water may be added to the neutralization vessel before the ammonia and wet-process phosphoric acid are added, or it may be fed with the acid and ammonia. The ammonia used may be either anhydrous or aqueous. The phosphoric acid may be either "filter acid" (25 to 32 percent $P_2O_5$) or concentrated acid, usually about 54 percent $P_2O_5$, which is equivalent to 74 to 75 percent phosphoric acid.

When the process is carried out continuously, ammonia, wet-process phosphoric acid, and any water required to balance the desired formulation are fed continuously at a controlled rate such that the pH in a first reaction vessel holds steady at about 8.0. The pH may vary somewhat from this without seriously affecting the quality of the suspension. However, at a pH above 8.5 the suspension tends to become very viscous, and below 7.5 the desired effect on stability of suspension is not attained. The ammonia and acid may be added in separate streams if this be more convenient. When added separately, vigorous mechanical mixing is required. Alternatively, the ammonia and acid may be fed through a single pipe which acts as a premixer. In this case, mixing by flow of fluid in the pipe is sufficient that mechanical agitation of the material in the reaction vessel is not required.

Temperature at which reaction is conducted is not very critical; that resulting from heat of reaction is satisfactory. Excessively low temperatures, below 150° F., however, give an undesirable increase in viscosity, especially when concentrated wet-process phosphoric acid is used. In the second stage, the pH of the resulting mixture is adjusted, preferably to the range from about 6.0 to 6.8. Some departure from this range is allowable, depending on the grade of product desired. The maximum allowable range is from 5.5 to 7.3.

It is preferably to add as much ammonia as possible at the high pH attained in the first stage, and then add only wet-process acid to lower the pH to the range from about 5.5 to 7.3 in the second stage. It is possible, however, to drop the pH to the second-stage level somewhat before all ammonia has reacted. Some ammonia and wet-process acid can be added in this stage without adversely affecting the physical properties of the resulting suspension. However, about 75 percent of all ammonia added should be added at the high pH level in the first stage. Supplementary fertilizer salts such as urea, ammonium nitrate, and potassium chloride also may be added to make various fertilizer grades. When such supplementary salts are used, it is desirable to use conditions of low temperature and high concentration of wet-process phosphoric acid fed so that the final suspension to which the supplemental salts are added has a relatively high viscosity.

The attached drawing illustrates diagrammatically one method for carrying out the process of my invention. Therein wet-process acid, water, and ammonia are continuously introduced at controlled rates via lines 1, 3, and 4, respectively, into reaction vessel 2, equipped with a mechanical agitation device 5. Ammonia line 4 extends into the bottom of reaction vessel 2 and is perforated at points within vessel 2.

Rates of flow of wet-process phosphoric acid and ammonia are controlled to maintain the pH of the resulting suspension in reaction vessel 2 in the range from 7.5 to 8.5, or preferably at about 8.0. A voluminous precipitate is formed in the liquid in vessel 2, but this is maintained in dispersed and suspended state by action of agitator 5. This precipitate is rather slow to settle, and agitator 5 can be omitted if wet-process phosphoric acid and ammonia are introduced through a single line, serving as a premixer.

The suspension overflows from reaction vessel 2 via line 6 to a neutralizing vessel 7, equipped with an agitator 8. Wet-process phosphoric acid is admitted in controlled quantity via line 9 and is thoroughly mixed with the suspension in vessel 7 by action of agitator 8. The rate of addition of wet-process phosphoric acid is controlled to maintain a pH in the range from 5.5 to 7.3, and preferably about 6.0 to 6.8 in vessel 7.

A fluid fertilizer containing a voluminous precipitate of impurities derived from wet-process phosphoric acid overflows from vessel 7 via line 11. This suspension is stable, substantially nonsettling, and has good pour properties and low viscosity. When no addition of supplemental fertilizer salts is necessary to produce the grade of fertilizer desired, the suspension is withdrawn via line 12 as finished product.

When addition of urea, ammonium nitrate, potassium chloride, trace elements or other fertilizer salts is required to produce a desired grade, the suspension overflowing from vessel 7 is introduced via line 11 into a mixing tank 14 equipped with an agitator 15. The fertilizer salts required are introduced into tank 14 and are dissolved, with stirring. Finished product is withdrawn via line 18.

Many modifications may be made in this process. For example, the process may be conducted batchwise in a single vessel by conducting the steps described above consecutively therein. Up to one-fourth of the total ammonia required may be introduced during the second stage of neutralization while pH of the suspension is being lowered by introduction of wet-process acid, as illustrated in vessel 7 in the drawing; but not more than one-fourth of the ammonia required can be introduced at this point without interfering with the stability of the suspension. When supplemental fertilizer salts are used, conditions resulting in rather high viscosity of the suspension are preferred. These conditions are: use of concentrated wet-process acid, first-stage ammoniation at a pH in the upper part of the permissible range, and/or low temperature in the first stage of ammoniation.

*Example*

Concentrated wet-process phosphoric acid (55 percent $P_2O_5$) and ammonia were fed into a reaction vessel at such rate that the pH of the suspension in the reaction vessel had a pH of 8.0 until all the ammonia was added. Good agitation was maintained. The remainder of the acid was then added to bring the pH down to the range of 6.0 to 6.8. The resulting suspension showed no settling whatever on standing for 1 week at room temperature (sedimentation volume=100). The viscosity was 68 cps. (measured with Brookfield viscometer after cooling to 80° F.); and after standing for a week at 32° F. followed by slight agitation, four properties were acceptable. The suspension was thixotropic.

In contrast, a suspension prepared from the same materials in a similar manner, except that the pH was held at 6.5 throughout the neutralization, settled undesirably (sedimentation volume=69). A sample prepared at a pH of 7.0 also settled badly (sedimentation volume=65).

The test was repeated with dilute acid (30 percent $P_2O_5$) rather than with concentrated acid. Again the sedimentation volume was 100. The viscosity was 130 cps. and the pour properties were even better after standing for 1 week at 32° F. than when concentrated acid was used. This suspension was not thixotropic.

The test was repeated with the pH held at 8.5 during neutralization rather than at 8.0. The sedimentation volume was 100, but the viscosity was so high (894 cps.) that the pour properties were unacceptable.

Neutral suspensions (8–24–0) made by the method described above were used in making other fertilizer grades. In one test urea was dissolved in the 8–24–0 to make a 13–13–0 grade. The 8–24–0 used had a viscosity of 146 cps. The resulting suspension settled very little (sedimentation volume=95), had a viscosity of 44 cps., and had excellent pour properties after standing a week at 32° F. In contrast, a similar 13–13–0 grade product made from 8–24–0 grade prepared by conventional neutralization methods and having a viscosity of 44 cps. settled badly (sedimentation volume=44), had a viscosity of 22 cps., and did not pour as well after standing.

I claim, as my invention:
1. A process for the production of a stable suspension fertilizer of high sedimentation volume, low viscosity, and good pour characteristics which comprises adding a stream of ammonia to wet-process phosphoric acid; controlling the proportion of added ammonia to produce a pH of 7.5 to 8.5 in the resulting suspension; thereafter intimately mixing wet-process phosphoric acid with the suspension in proportion to lower the pH into the range from 5.5 to 7.3; and withdrawing as product the resulting stable suspension.

2. A process for the production of a stable suspension fertilizer of high sedimentation volume, low viscosity, and good pour characteristics which comprises adding a stream of ammonia to wet-process phosphoric acid at a rate to maintain a temperature above 150° F.; controlling the proportion of added ammonia to produce a pH of about 8.0 in the resulting suspension; thereafter intimately mixing wet-process phosphoric acid with the suspension in proportion to lower the pH into the range from 6.0 to 6.8; and withdrawing as product the resulting stable suspension.

3. A process for the production of a stable suspension fertilizer of high sedimentation volume, low viscosity, and good pour characteristics which comprises adding a stream of ammonia to wet-process phosphoric acid containing from 25 to 32 percent $P_2O_5$ at a rate to maintain a temperature above 150° F.; controlling the proportion of added ammonia to produce a pH of about 8.0 in the resulting suspension; thereafter intimately mixing wet-process phosphoric acid with the suspension in proportion to lower the pH into the range from 6.0 to 6.8; and withdrawing as product resulting stable suspension.

References Cited in the file of this patent

UNITED STATES PATENTS

| | | |
|---|---|---|
| 2,726,949 | Andres et al. | Dec. 13, 1955 |
| 2,770,538 | Vierling | Nov. 13, 1956 |
| 2,792,286 | Wordie et al. | May 14, 1957 |
| 2,917,380 | Franklin | Dec. 15, 1959 |
| 2,950,961 | Striplin et al. | Aug. 30, 1960 |